(12) United States Patent
Harvey et al.

(10) Patent No.: US 10,905,972 B2
(45) Date of Patent: Feb. 2, 2021

(54) SOLVENT-INDUCED SEPARATION OF OILFIELD EMULSIONS

(71) Applicant: Halliburton Energy Services, Inc., Houston, TX (US)

(72) Inventors: Timothy Neal Harvey, Humble, TX (US); Cato Russell McDaniel, Montgomery, TX (US); Katerina V. Newman, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 246 days.

(21) Appl. No.: 15/545,251

(22) PCT Filed: Feb. 27, 2015

(86) PCT No.: PCT/US2015/018151
§ 371 (c)(1),
(2) Date: Jul. 20, 2017

(87) PCT Pub. No.: WO2016/137515
PCT Pub. Date: Sep. 1, 2016

(65) Prior Publication Data
US 2018/0021697 A1   Jan. 25, 2018

(51) Int. Cl.
*B01D 17/04* (2006.01)
*E21B 21/06* (2006.01)
*C01B 32/50* (2017.01)

(52) U.S. Cl.
CPC .......... *B01D 17/047* (2013.01); *E21B 21/063* (2013.01); *C01B 32/50* (2017.08)

(58) Field of Classification Search
CPC .................................................. B01D 17/047
See application file for complete search history.

(56) References Cited

U.S. PATENT DOCUMENTS

| 3,561,883 A | 2/1971 | Berry |
| 4,618,315 A | 10/1986 | Papst et al. |
| 4,662,819 A | 5/1987 | Lakowske et al. |

(Continued)

FOREIGN PATENT DOCUMENTS

| CA | 566698 | 11/1958 |
| DE | 102010035284 | 3/2012 |

(Continued)

OTHER PUBLICATIONS

International Search Report and Written Opinion for PCT/US14/18151 dated Sep. 4, 2014.

(Continued)

*Primary Examiner* — Peter Keyworth
(74) *Attorney, Agent, or Firm* — Tenley Krueger; C. Tumey Law Group PLLC

(57) ABSTRACT

Systems and methods for separation of oleaginous fluids, aqueous fluids, and solids from drilling or other oilfield emulsions by solvent extraction. A method for separation of oilfield emulsions comprising: providing an oilfield emulsion prepared for use in a wellbore and/or recovered from a wellbore; mixing the oilfield emulsion with at least a solvent to form at least a mixture; and separating the mixture to at least partially recover an oleaginous phase of the oilfield emulsion.

19 Claims, 5 Drawing Sheets

(56) References Cited

U.S. PATENT DOCUMENTS

| | | | |
|---|---|---|---|
| 5,186,817 A * | 2/1993 | Paspek | B01D 11/0488 |
| | | | 208/188 |
| 7,128,169 B2 * | 10/2006 | Massetti | B01D 11/0219 |
| | | | 175/66 |
| 7,686,933 B2 | 3/2010 | Browne et al. | |
| 8,128,827 B2 | 3/2012 | Gallo et al. | |
| 2006/0070772 A1 * | 4/2006 | deBoer | E21B 21/001 |
| | | | 175/70 |
| 2010/0069686 A1 | 3/2010 | Waibel et al. | |
| 2010/0236660 A1 | 12/2010 | Ballard et al. | |
| 2010/0300967 A1 * | 12/2010 | Dakin | C09K 8/52 |
| | | | 210/634 |
| 2012/0298559 A1 | 11/2012 | Newman et al. | |
| 2013/0264284 A1 | 10/2013 | Dixit et al. | |
| 2015/0144565 A1 * | 5/2015 | Kaminski | C02F 1/283 |
| | | | 210/664 |

FOREIGN PATENT DOCUMENTS

| | | |
|---|---|---|
| WO | 9623140 | 8/1996 |
| WO | 2009073438 | 6/2009 |

OTHER PUBLICATIONS

Great Britian Search Report and Written Opinion for GB1711673.2 dated Aug. 25, 2020.

* cited by examiner

SOLVENT-INDUCED SEPARATION OF OILFIELD EMULSIONS

BACKGROUND

Provided are systems and methods for breaking oilfield emulsions. More particularly, systems and methods may be provided for separation of oleaginous fluids, aqueous fluids, and/or solids from oilfield emulsions, such as drilling fluids, by solvent extraction.

During the drilling of a wellbore into a subterranean formation, a drilling fluid, also referred to as a drilling mud, may be continuously circulated from the surface down to the bottom of the wellbore being drilled and back to the surface again. Among other functions, the drilling fluid serves to transport wellbore cuttings up to the surface, cool the drill bit, and provide hydrostatic pressure on the walls of the drilled wellbore. Drilling fluids may typically be water-based or oil-based and synthetic-based fluids. A typical oil-based fluid may be a water-in-oil emulsion (commonly referred to as an "invert emulsion") that comprises an oleaginous continuous phase and a liquid discontinuous phase. To avoid the loss of the drilling fluid and allow its reuse, the cuttings may typically be separated from the drilling fluid at the surface. A variety of different solids separation equipment may be used at the well site, including shale shakers, desanders, desilters, mud cleaners, centrifuges, and the like. After removal of the drilling cuttings, the recovered drilling fluid may be reused in the wellbore. While typical solids separation equipment may be effective at removing cuttings, small solids may accumulate in the drilling fluid, which may undesirably impact drilling fluid properties.

After the drilling operation is complete, the drilling fluid may need to be disposed of in some manner. The drilling fluid for disposal may contain some solids (e.g., cuttings, drilling fluid additives) that were not removed by the solids separation equipment. While water-based drilling fluids may be disposed of, for example, pit burial, after the operation is complete, the environmental and economic concerns with oil-based drilling fluids may necessitate their recycle and reuse. One technique for recycle of oil-based drilling fluids involves a thermal processing in which heat is used for separation of the oil, water, and solids. Heat may aid in solids removal by mechanical means or it can be increased to where the separation process becomes a distillation process. Thermal processes may require significantly more energy than either mechanical or solvent based methods of emulsion breaking, regardless of the heat source (indirectly fired calciners, microwave, friction based heat, electrical, etc.).

BRIEF DESCRIPTION OF THE DRAWINGS

These drawings illustrate certain aspects of some examples of the present invention, and should not be used to limit or define the invention.

DETAILED DESCRIPTION

Figure 1:
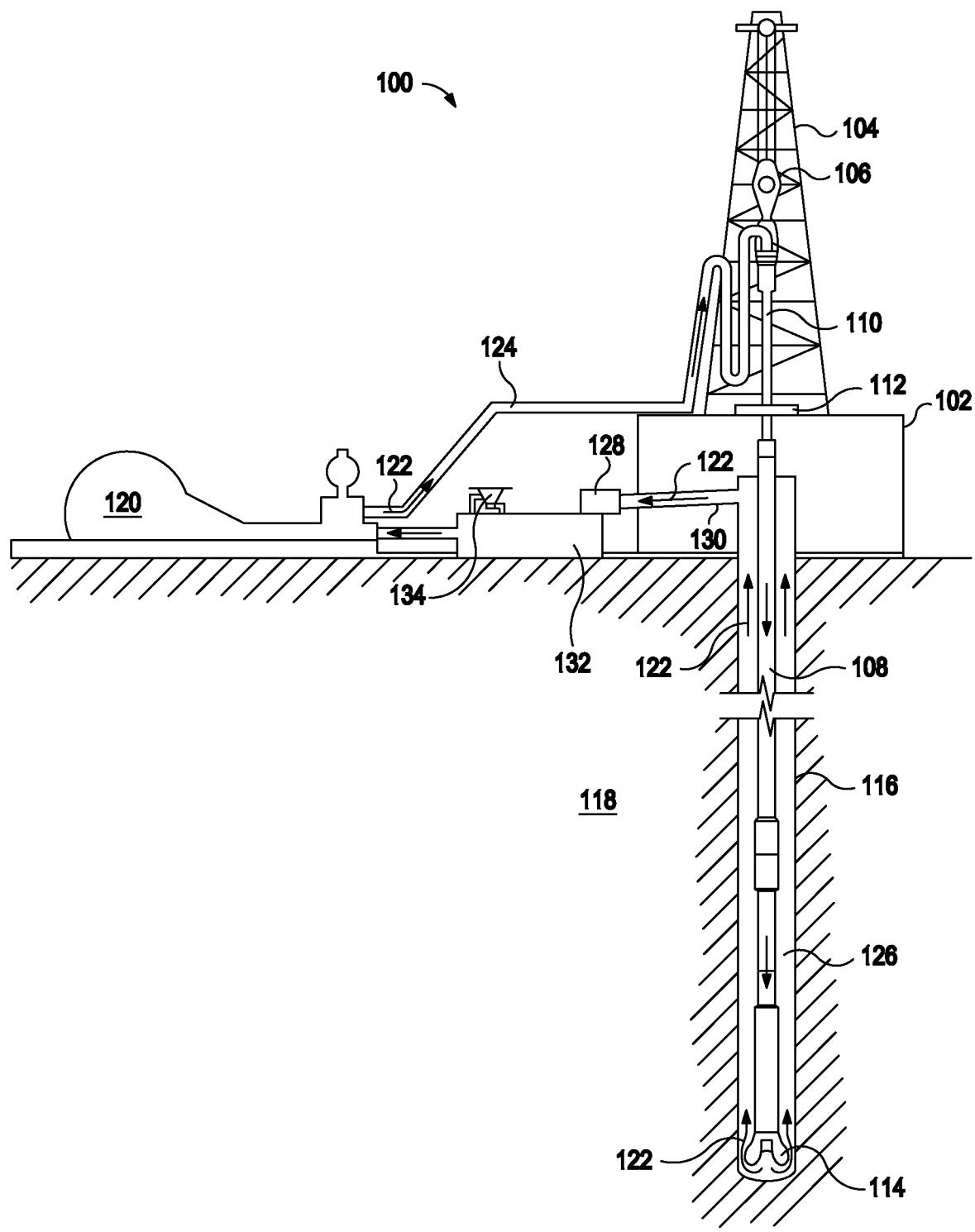
FIG. 1 is a schematic diagram of an example drilling assembly.

As disclosed below, systems and methods may be provided for breaking oilfield emulsions and, more particularly, systems and methods may be provided for separation of oleaginous fluids, aqueous fluids, and/or solids from oilfield emulsions by solvent extraction. Oilfield emulsions tend to be a combination of classical emulsions composed of a hydrocarbon base oil, water and emulsifier and solids-stabilized or Pickering type emulsion. The more oilfield emulsions, such as drilling fluids, are used, the smaller the retained solids become until they reach colloidal size. With extended periods of reuse of these oilfield emulsions, the classical emulsions become further stabilized by these colloidal solids. It may be desired to separate the solids from the drilling fluid (or other oilfield emulsion) to allow, for example, recycle and re-use of the base fluid (e.g., oleaginous fluid), whether in the same or different drilling operation. By mixing the oilfield emulsion with a suitable solvent, either liquid or critical phase, the oilfield emulsion may be broken into its primary components parts, which may allow rapid separation of the solids. The solids may then be separated from the liquid using mechanical separation techniques, for example. Liquid/supercritical carbon dioxide may be used alone as the solvent or in combination with another solvent to accelerate settling of the solids. The solvent and/or carbon dioxide may be recovered from the base fluid, recycled, and reused. The liquid solvent may flash to gas with a change in pressure or temperature, allowing removal and recycle of the solvent.

There may be several potential advantages to the systems and methods disclosed herein, only some of which may be alluded to herein. One of the many potential advantages may be that drilling waste may be minimized while maximizing the recovery and reuse of the base fluid and commercial solids. Another potential advantage may be that the process and methods may be performed at temperature and pressure conditions requiring a low energy input per unit of the recovered base fluid where the solvent may be recycled and reused. Additionally, because the process requires relatively low temperature and pressure, there may be no destruction or modification of drilling fluid additives, such as emulsifiers, wetting agents, rheology modifiers, and filtration control additives, among others. Further, the process may operate below the temperatures at which certain oleaginous fluids commonly used in drilling fluids may degrade. Furthermore, due to temperature and pressure needs, the process and methods offer safer conditions for humans and environment.

A method may be provided for separation of oilfield emulsions comprising: providing an oilfield emulsion prepared for use in a wellbore and/or recovered from a wellbore; mixing the oilfield emulsion with at least a solvent to form at least a mixture; and separating the mixture to at least partially recover an oleaginous phase of the oilfield emulsion. The oilfield emulsion may comprise a drilling fluid in the form of an invert emulsion and/or a solids-stabilized emulsion. The oilfield emulsion may comprise an oleaginous continuous phase and a discontinuous phase, the oleaginous continuous phase being at least partially recovered in the step of separating the mixture. The oleaginous continuous phase may comprise at least one oleaginous liquid selected from the group consisting of a diesel oil, a crude oil, a paraffin oil, a mineral oil, an olefin, an ester, an amide, an amine, a polyolefin, a polydiorganosiloxane, a siloxane, an organosiloxane, an ether, an acetal, a dialkylcarbonate, a hydrocarbon, and combinations thereof, wherein the volume to volume ratio of the oleaginous continuous phase to the discontinuous phase is in the range of from 20:80 to 95:5. The solvent may comprise a solvent or mixture of solvents whereby mixing the solvent with the oilfield emulsion breaks a solids-stabilized emulsion in the oilfield emulsion. The solvent may comprise a paraffinic hydrocarbon having from four carbons to eight carbons. The step of separating the mixture may comprise separating the mixture into at least a solids-laden fraction and an oleaginous-solvent fraction. The solids-laden fraction may comprise barite, and wherein the method further may comprise using the barite recovered from the oilfield emulsion in a drilling fluid. The method may further comprise separating the solvent oleaginous-fraction into at least a recovered solvent and an oleaginous-enriched phase. The method may further comprise reusing the recovered oleaginous phase in a drilling operation. The method may further comprise mixing the oilfield emulsion with carbon dioxide. The method may further comprise recovering and recycling at least a substantial portion of the carbon dioxide and/or the solvent. The step of mixing the oilfield emulsion with carbon dioxide may further comprise counter-currently contacting the mixture of the oilfield emulsion and the solvent with the carbon dioxide. The method may further comprise mixing the oilfield emulsion with one or more of a brine, a surfactant, a demulsifying agent, fresh water, steam, a glycerol, a polyol, glycols, or combinations thereof.

A separation system may comprise a mixing unit fluidically coupled to a separation feed and a solvent feed, wherein the separation feed comprises an oilfield emulsion; and a separation unit fluidically coupled to the mixing unit. The separation system may further comprise a $CO_2$ mixing unit fluidically coupled to a liquid carbon dioxide feed and fluidically coupled to the mixing unit for receiving a mixture of the separation feed and the solvent feed. The $CO_2$ mixing unit may comprise a column for counter-currently contacting the liquid carbon dioxide feed and the mixture of the separation feed and the solvent feed. The separation system may further comprise a solvent flash tank fluidically coupled to the separation unit. The separation system may further comprise a carbon dioxide flash tank fluidically coupled to the solvent flash tank. The separation system may further comprise the separation feed, wherein the oilfield emulsion may comprise an invert emulsion drilling fluid. The mixing unit may be fluidically coupled to a retention pit, wherein the retention pit may comprise the separation feed.

FIG. 1 illustrates an example drilling assembly 100 in which a drilling fluid 122 may be used. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 may support the drill string 108 as it is lowered through a rotary table 112. A drill bit 114 may be attached to the distal end of the drill string 108 and may be driven either by a downhole motor and/or via rotation of the drill string 108 from the well surface. The drill bit 114 may include, but is not limited to, roller cone bits, PDC bits, natural diamond bits, any hole openers, reamers, coring bits, etc. As the drill bit 114 rotates, it may create a wellbore 116 that penetrates various subterranean formations 118.

A pump 120 (e.g., a mud pump) may circulate drilling fluid 122 through a feed pipe 124 and to the kelly 110, which conveys the drilling fluid 122 downhole through the interior of the drill string 108 and through one or more orifices in the drill bit 114. The drilling fluid 122 may then be circulated back to the surface via an annulus 126 defined between the drill string 108 and the walls of the wellbore 116. At the surface, the recirculated or spent drilling fluid 122 may exit the annulus 126 and may be conveyed to one or more fluid processing unit(s) 128 via an interconnecting flow line 130. The fluid processing unit(s) 128 may include, but is not limited to, one or more of a screening device (e.g., shale shaker), a centrifuge, a hydrocyclone, a separator (including magnetic and electrical separators), a desilter, a desander, a separator, a filter (e.g., diatomaceous earth filters), a heat exchanger, and/or any fluid reclamation equipment. The fluid processing unit(s) 128 may further include one or more sensors, gauges, pumps, compressors, and the like used store, monitor, regulate, and/or recondition the drilling fluid.

After passing through the fluid processing unit(s) 128, a "cleaned" drilling fluid 122 may be deposited into a nearby retention pit 132 (i.e., a mud pit) for future reuse. While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure. One or more of the drilling fluid additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. Alternatively, the drilling fluid additives may be added to the drilling fluid 122 at any other location in the drilling assembly 100. While FIG. 1 shows only a single retention pit 132, there could be more than one retention pit 132, such as multiple retention pits 132 in series. Moreover, the retention pit 132 may be representative of one or more fluid storage facilities and/or units where the drilling fluid additives may be stored, reconditioned, and/or regulated until added to the drilling fluid 122.

Drilling fluid 122 may be an oil-based or a synthetic-based drilling fluid in the form of an invert emulsion, as will be appreciated by those of ordinary skill in the art. An example of a suitable drilling fluid 122 may be in the form of an invert emulsion that comprises an oleaginous continuous phase and a liquid discontinuous phase. The ratio of the oleaginous continuous phase to the liquid discontinuous phase in the invert emulsion, for example, may be in the range of 20:80 v/v CDR (continuous phase to discontinuous phase ratio) to 90:10 or, alternatively 20:80 v/v CDR to 50:50 v/v CDR. The oleaginous continuous phase can be any suitable vol % of the invert emulsion. For example, the oleaginous continuous phase can be about 1 vol % to about 99 vol % of the invert emulsion, about 10 vol % to about 50 vol %, or about 1 vol % or less, or about 2 vol %, 3, 4, 5, 6, 8, 10, 12, 14, 16, 18, 20, 25, 30, 35, 40, 45, 50, 55, 60, 65, 70, 75, 80, 85, 90, 91, 92, 93, 94, 95, 96, 97, 98, or about 99 vol % or more of the invert emulsion.

The oleaginous continuous phase of the drilling fluid 122 may contain an oleaginous fluid. The oleaginous fluid may also be referred to herein as a "base fluid," for example, where the drilling fluid 122 is in the form of an invert emulsion. The oleaginous fluid may comprise any oil-based and synthetic-based fluids suitable for use in emulsions. The oleaginous fluid may be from a natural or synthetic source. Examples of suitable oleaginous fluids may include, without limitation, diesel oils, crude oils, paraffin oils, mineral oils, low toxicity mineral oils, olefins, esters, amides, amines, synthetic oils such as polyolefins, polydiorganosiloxanes, siloxanes, organosiloxanes and combinations thereof, ethers, acetals, dialkylcarbonates, hydrocarbons, or combinations thereof. Additional examples of suitable oleaginous fluids may include, without limitation, those available from Halliburton Energy Services, Inc., in association with the trademarks ACCOLADE® internal olefin and ester blend invert emulsion base fluid, PETROFREE® ester based invert emulsion base fluid, PETROFREE® LV ester based invert emulsion base fluid, and PETROFREE® S.F internal olefin based invert emulsion base fluid." Factors that determine which oleaginous fluid will be used in a particular application, include but are not limited to, the cost and performance characteristics of the oleaginous fluid. An additional factor that may be considered is the polarity of the oleaginous fluid. For example, diesel oils are generally more polar than paraffin oils. Other factors that may be considered are environmental compatibility and regional drilling practices. For example, in North Sea applications, an ester or internal olefin (IO) may be preferred. In the Gulf of Mexico, applications may prefer to utilize ACCOLADES® fluid or a low toxicity mineral oil.

The liquid continuous phase of the drilling fluid 122 may comprise a fluid that is at least partially immiscible in the oleaginous fluid. This partially immiscible fluid may be a non-oleaginous fluid that is mutually insoluble with the chosen oleaginous fluid. Suitable examples of partially immiscible fluids may include, without limitation, aqueous-based fluids, glycerin, glycols, polyglycol amines, polyols, derivatives thereof that are partially immiscible in the oleaginous fluid, or combinations thereof. Aqueous-based fluids may include, but are not limited to, fresh water, sea water, salt water, and brines (e.g., saturated salt waters). Suitable brines may include heavy brines. Heavy brines, for the purposes of this application, include brines that may be used to weight up a fluid, such as a treatment fluid, instead of using traditional weighting agents. Brines may comprise $H_2O$ soluble salts, such as sodium chloride, calcium chloride, calcium bromide, zinc bromide, potassium carbonate, sodium formate, potassium formate, sodium acetate, potassium acetate, calcium acetate, ammonium acetate, ammonium chloride, ammonium bromide, sodium nitrate, potassium nitrate, ammonium nitrate, calcium nitrate, sodium carbonate, potassium carbonate, and combinations thereof. Factors that determine what partially immiscible fluid will be used in a particular application include for example, without limitation, cost, availability, and which oleaginous fluid has been chosen. Another factor that may be considered is the application of the emulsion. For example, if the application needs an emulsion with a heavy weight, a zinc bromide brine (for example) may be chosen.

The drilling fluid 122 may additionally comprise drilling fluid additives, which may include viscosifiers, emulsifiers, weighting agents, etc. The drilling fluid may comprise solids. The solids may be any type of solids found in a wellbore or introduced into a wellbore fluid. Without limitation, examples of solids may include pieces of the formation, drill cuttings, and additives introduced to a drilling fluid, e.g., lost circulation materials, weighting agents, etc. Suitable examples of weighting agents include, for example, materials having a specific gravity of 3 or greater, such as barite.

As previously described, it may be desired to recycle and reuse the drilling fluid 122. By way of example, the drilling fluid 122 may be separated into its constituent parts so that the base fluid (e.g., oleaginous fluid) may be recycled and reused in the same or different drilling operation. However, the drilling fluid 122 may contain solids-stabilized emulsions (also referred to as "Pickering emulsions") that may make separation complex. While the drilling assembly 100 contains fluid processing unit(s) 128 that may contain solid separation equipment (e.g., shale shaker, etc.), the fluid processing unit(s) 128 may not be effective at removing small solids, such as those having a particle size of less than 10 microns. Accordingly, the drilling fluid 122 may still contain at least 2% by weight or, alternatively, at least 5% by weight or less of solids having a particle size of less than 10 microns, even after the fluid processing unit(s) 128. For example, the drilling fluid 122 may contain about 2%, about 3%, about 4%, about 5%, about 10%, about 20%, about 30%, about 40%, about 50%, about 60% by volume of solids having a particle size of less than 10 microns (commonly called "low gravity solids"). By way of further example, the drilling fluid 122 may contain at least 2% by weight of low gravity solids and at least 2% by weight of commercial solids that are normally at or below 10 microns by size. By way of example, the drilling fluid 122 may contain weighting agents (e.g., barite, calcium carbonate, hematite and others) in an amount of at least 2% by weight. Often 5% or more by weight of low gravity solids may be left in the drilling fluids preventing the fluid to be used again for drilling operations and then the fluid may be deemed unusable due to unacceptable fluids properties.

Figure 2:
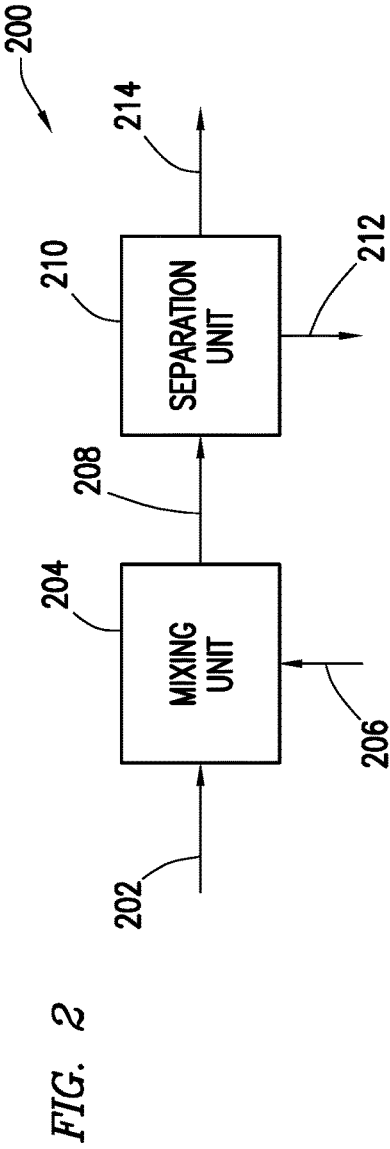
FIG. 2 is a schematic diagram of an example separation system.

Referring now to FIG. 2, a schematic diagram is shown generally depicting a separation system 200 that may be used for separation of an oilfield emulsion, such as drilling fluid 122. Separation of the oilfield emulsion may facilitate recovery and reuse of the oleaginous phase of the oilfield emulsion. The oilfield emulsion may be in the form of an invert emulsion or solids-stabilized emulsion. As illustrated, a separation feed 202 comprising an oilfield emulsion may be fed to a mixing unit 204. Solvent feed 206 may also be fed to the mixing unit 204. From the mixing unit 206, the mixture 208 of the separation feed 202 and the solvent feed 206 may be feed to a solids separation unit 210. In the solids separation unit 210, at least a portion of solids from the separation feed 202 may be removed from the mixture 208. The separation system 200 may be at the well site or may be offsite, for example, at a different location than the drilling assembly 100.

The separation feed 202 may comprise an oilfield emulsion, such as drilling fluid 122 described above in connection with FIG. 1. The separation feed 202 may also comprise other oilfield emulsions used in well operations, such as drill-in fluids, completion fluids, etc. The oilfield emulsion may be an invert emulsion and/or solids-stabilized emulsion, as described above in connection with drilling fluid 122. For example, the oilfield fluid may comprise an oleaginous continuous phase and a liquid discontinuous phase. The oilfield fluid may comprise colloidal solids, such as drill cuttings and drilling fluid additives. As described above with respect to the drilling fluid 122, the oilfield fluid may comprise solids having a particle size of less than 10 microns. The separation feed 202 may be at a temperature of from less than 20° F. to 200° F. and a pressure of from about 0 psi to about 1,500 psi.

The solvent feed 206 may comprise, without limitation, any of a variety of solvents that may be liquefied gases (e.g., carbon dioxide), alkanes and lower alkanes, lower hydrocarbons, chlorofluorocarbons, carbonate esters, halogenated hydrocarbons, esters, alcohols and long chain alcohols, esters, internal olefins, alpha-olefins, ketones, liquefied carbon dioxide, non-polar and polar organic solvents and combinations of these solvents. Lower alkanes and lower hydrocarbons generally refer to alkanes and hydrocarbons containing five or less carbon atoms, such as methane, ethane, propane, butane, pentane, etc. For invert emulsions, examples of suitable solvents may be miscible with the oleaginous phase or soluble one in another. Examples of suitable solvents may include polar organic solvents that may be oil-soluble. For example, the polar organic solvent may include, without limitation, acetone, chloroform, cichloromethane, tetrahydrofuran, ethyl acetate, acetone, dimethylformamide, acetonitrile, dimethyl sulfoxide, propylene carbonate, formic acid, n-butanol, isopropanol, n-propanol, ethanol, methanol, acetic acid, nitromethane, N-methylpyrrolidone, or combinations thereof. Additional examples of suitable solvents may include paraffinic hydrocarbons having four to eight carbon atoms, such as butane, propane, pentane, hexane, heptane, and octane. The paraffinic hydrocarbons may include cycloalkanes and isoalkanes. The proportion of the solvent may be selected to provide the desired separation of solids from the separation feed 202. For example, the solvent may be supplied to the mixing unit 204 in an oilfield emulsion to solvent ratio in range of 1:40 v/v to 9:1 v/v or, alternatively, from 1:40 v/v to 1:1 v/v, or, alternatively, from about 1:0.3 v/v to about 1:20 v/v. It should understood that ratios outside these specific values may be used for certain applications as desired by those of ordinary skill in the art.

In the mixing unit 204, the separation feed 202 and the solvent feed 206 may be mixed. While FIG. 2 illustrates separate introduction of the separation feed 202 and the solvent feed 206 into the mixing unit 204, those of ordinary skill in the art, with the benefit of this disclosure, should appreciate that the streams can be combined prior to their introduction into the mixing unit 204. By mixing of the separation feed 202 with the solvent feed, separation of the solids in the separation feed 202 from the base fluid may facilitated. As the separation feed may be an invert emulsion, such as a drilling fluid, the solvent feed 206 may facilitate breaking of the emulsion so that the separation feed 202 can be more easily separated into its constituent parts, thus allowing recovery and reuse of the base fluid (e.g., oleaginous fluid as well as certain solids such as barite). By addition of the solvent, the density of the separation feed 202 and its viscosity may be decreased to induce separation. Mixing unit 204 may use any suitable mixing technique for mixing of the separation feed 202 and the solvent feed 206 in a designated ratio. For example, the mixing unit 204 may use any of a variety of different mixing equipment, such as static or dynamic mixers. One example of suitable equipment may comprise a vessel with a paddle or plurality of paddles wherein the paddle(s) may be used to mixing the separation feed 202 and the solvent feed 206. Other examples may include extraction equipment, such as mixer-settlers, counter-current columns (e.g., packed columns, pulsed columns, etc.), or centrifugal contactors, among others, as will be appreciated by those of ordinary skill in the art. The mixing unit 204 and the solids separation unit 210 may combined into a single unit, for example, where common equipment may be used for mixing and separation of the solids from the base fluid. Pumps or other delivery equipment may be used for delivery of the separation feed 202 and the solvent feed 206 to the mixing unit 204.

A mixture 208 of the separation feed 202 and the solvent feed 206 may be withdrawn from the mixing unit 204 and fed to the solids separation unit 210. In solids separation unit 210 solids may be separated from the mixture 208. By way of example, due to breaking of the invert emulsion in the separation feed 202 via combination with the solvent feed 206, the solids in the separation feed 202 may be separated from the liquid components such as the base fluid. Solids separation unit 210 may use any suitable separation technique for separation of the solids in the mixture 208. Examples of suitable separation techniques may include, without limitation, cyclonic separator, centrifugal separators, gravity separators, and combinations thereof.

From the solids separation unit 210, a solids-laden fraction 212 may be collected, which may contain a high solids fraction. By way of example, the solids-laden fraction 212 may contain a substantial portion of the solids from the separation feed 202. By way of further example, the solids-laden fraction 212 may contain about 20%, 30%, 40%, 50%, 60%, 70%, 80%, 90%, 95%, 98%, 99%, or more by weight of the solids from the separation feed 202. A liquid fraction 214 may also be withdrawn from the solids separation unit 210. The liquid fraction 214 may contain a total solids content of less than about 10%, 5%, 2%, 1%, or 0.5%, or less by volume. The liquid fraction 214 may contain substantially all of the liquids introduced into the mixing unit 204. By way of example, the liquid fraction 214 may contain a substantial portion of the solvent from the solvent feed 206 and a substantial portion of the liquid phase of the separation feed 202.

Figure 3:
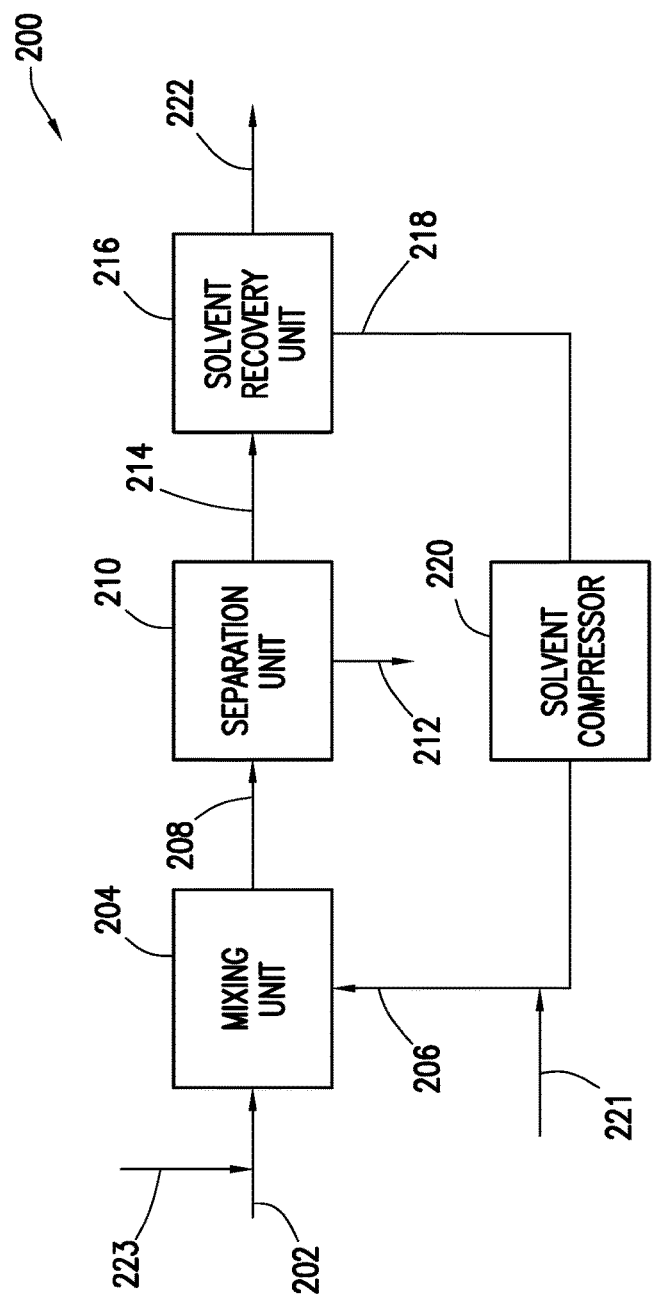
FIG. 3 is a schematic diagram of another example separation system.

Referring now to FIG. 3, separation system 200 is shown further including a solvent recovery unit 216. The mixing unit 204, solids separation unit 210, and the various feeds thereto are described above with respect to FIG. 2. From the solids separation unit 210, the liquid fraction 214 may be supplied to the solvent recovery unit 216. In the solvent recovery unit 216, the solvent may be separated from the other liquids in the liquid fraction 214. By way of example, the solvent may be separated from the liquid phase of the separation feed 202. The solvent recovery unit may use any suitable technique for solvent separation including phase change, purging with a gas, a liquid or a fluid, or flashing.

A recovered solvent 218 may be withdrawn from the solvent recovery unit 216. The recovered solvent 218 may be supplied to solvent compressor 220 and then to mixing unit 204 as solvent feed 206. The recovered solvent 218 may comprise a substantial portion of the solvent from the solvent feed 206 that was originally introduced into the mixing unit 204. For example, the recovered solvent 218 may comprise about 75%, 80%, 85%, 90%, 95%, 99%, or more by weight of the solvent from the solvent feed 206 that was originally fed to the mixing unit 204. Solvent make-up 221 may be added to the solvent feed 206 to compensate for any solvent that may be lost in the separation system 200.

An oleaginous-enriched stream 222 may also be withdrawn from the solvent recovery unit 216. The oleaginous-enriched stream 222 may comprise a substantial portion of the liquid fraction from the separation feed 202. For example, the oleaginous-enriched stream 222 may comprise about 60%, 70%, 80%, 85%, about 90%, about 95%, about 99%, or more by weight of the oleaginous fluid in the separation feed 202. The oleaginous-enriched stream 222 may be recycled and re-used in the same or different drilling operation. By way of example, drilling fluid additives, which may include viscosifiers, emulsifiers, weighting agents, etc., may be added to the oleaginous-enriched stream, to form a drilling fluid in the form of an invert emulsion, which may then be used in drilling of a wellbore.

As illustrated on FIG. 3, additive stream 223 may be used to supply one or more additives to the separation feed 202. As illustrated, the additive stream 223 may be combined with the separation feed 202 prior to introduction into the mixing stage 204. Alternatively, the additive stream 223 may be combined with the separation feed 202 at other points in the separation system 200, such as in the mixing unit 204, after the mixing unit 204, etc. The additive stream 223 may include a brine (e.g., a calcium chloride brine, sodium chloride brine, etc.), base oils used for drilling fluids and other drilling fluids components, fresh water, fresh overheated water and steam, surfactants, demulsifying agents, glycerols and polyols, glycols, or combinations thereof.

Figure 4:
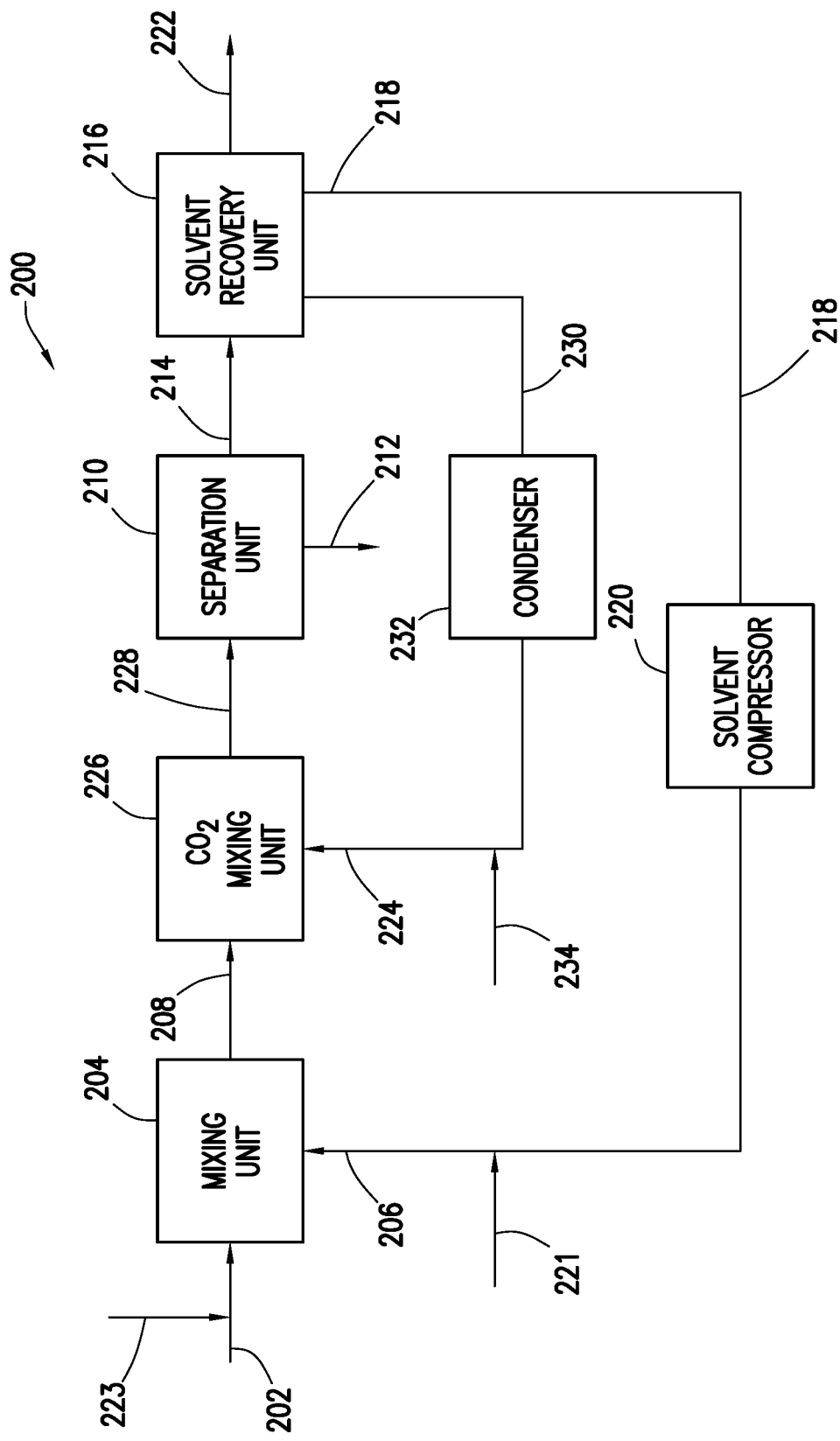
FIG. 4 is a schematic diagram of another example separation system.

Referring now to FIG. 4, the separation system 200 is shown further including use of liquid carbon dioxide to facilitate solids separation. The mixing unit 204, solids separation unit 210, and the various feeds thereto are described above with respect to FIG. 2. As illustrated, a carbon dioxide feed 224 may be combined with mixture 208 in a $CO_2$ mixing unit 226. As previously described, the mixture 208 may comprise the separation feed 202 and the solvent feed 206. While FIG. 2 illustrates separate introduction of the separation feed 202 and the solvent feed 206 into the $CO_2$ mixing unit 226, those of ordinary skill in the art, with the benefit of this disclosure, should appreciate that the streams can be combined prior to their introduction into the $CO_2$ mixing unit 226.

The carbon dioxide feed 224 may comprise liquid carbon dioxide or supercritical carbon dioxide, which may be fed to the $CO_2$ mixing unit 226. The carbon dioxide feed 224 may be at a temperature of from about −70F and a pressure about 75 psi to about 88° F. and a pressure about 1070 psi. In some instances, the temperature and pressure of the carbon dioxide feed 224 may be selected so that the carbon dioxide feed 224 comprises saturated liquid carbon dioxide. Alternatively, the temperature and pressure of the carbon dioxide feed 224 may be selected so that the liquid carbon dioxide is not saturated. The supercritical carbon dioxide feed 224 may be at a temperature of above about 88° F. and a pressure above about 1069 psi.

In the $CO_2$ mixing unit 226, the carbon dioxide feed 224 may be mixed with the mixture 208 of the separation feed 202 and the solvent feed 206. By mixing of the carbon dioxide feed 224 with the solvent feed 206, breaking and/or separation of the emulsions in the separation feed 202 may be facilitated, thus allowing recovery and reuse of the base fluid. Without being limited by theory, it is believed that liquid and supercritical carbon dioxide may demonstrate properties similar and typical of hydrocarbon solvents but provide more hydrogen bonding basicity facilitating separation of soluble and miscible liquids. Liquid carbon dioxide may have a strong homogenizing effect allowing different previously immiscible components to form a single phase and be separated from other components. Low surface tension and viscosity, low polarity and high compressibility may equally benefit the separation and ease solvent recovery. $CO_2$ mixing unit 226 may use any suitable mixing technique for mixing of the carbon dioxide feed 224 and the mixture 208 in a designated ratio. For example, the $CO_2$ mixing unit 226 may use any of a variety of different mixing equipment, such as static or dynamic mixers. One example of suitable equipment may comprise a vessel with a paddle. Other examples may include counter-current columns (e.g., packed columns, pulsed columns, etc.), as will be appreciated by those of ordinary skill in the art. The mixing unit 204, the $CO_2$ mixing unit 226, and the solids separation unit 210 may combined into a single unit, for example, where common equipment may be used for mixing and separation of the solids from the base fluid. Pumps or other delivery equipment may be used for delivery of the carbon dioxide feed 224 to the $CO_2$ mixing unit 226.

After combination in the $CO_2$ mixing unit 226, the carbon dioxide, solvent, and oilfield emulsion may be transferred to the solids separation unit 210 via line 228 to separate the solids from the liquid phase. After removal of the solids, the liquid fraction 214, which may comprise some carbon dioxide vapor, may be transferred to solvent recovery unit 216 for separation of the solvent and carbon dioxide from the liquid phase of the separation feed 202. An oleaginous-enriched stream 222, which may comprise a substantial portion of the liquid fraction from the separation feed 202, may be withdrawn from the solvent recovery unit 216. Recovered solvent 218 and recovered carbon dioxide 230 may also be withdrawn from the solvent recovery unit 216. The recovered carbon dioxide 230 may comprise carbon dioxide, which may be in liquid, vapor, and/or gaseous form. The recovered carbon dioxide 230 may be supplied to condenser 232 and then to $CO_2$ mixing unit 226 as carbon dioxide feed 224. The recovered carbon dioxide 230 may comprise a substantial portion of the carbon dioxide from the carbon dioxide feed 224 that was originally introduced into the $CO_2$ mixing unit 226. For example, the recovered carbon dioxide 230 may comprise about 80%, 85%, 90%, 95%, 99%, or more by weight of the solvent from the carbon dioxide feed 224 that was originally fed into the $CO_2$ mixing unit 226. Carbon dioxide make-up 234 may be added to the carbon dioxide feed 224 to compensate for any solvent that may be lost in the separation system 200.

Figure 5:
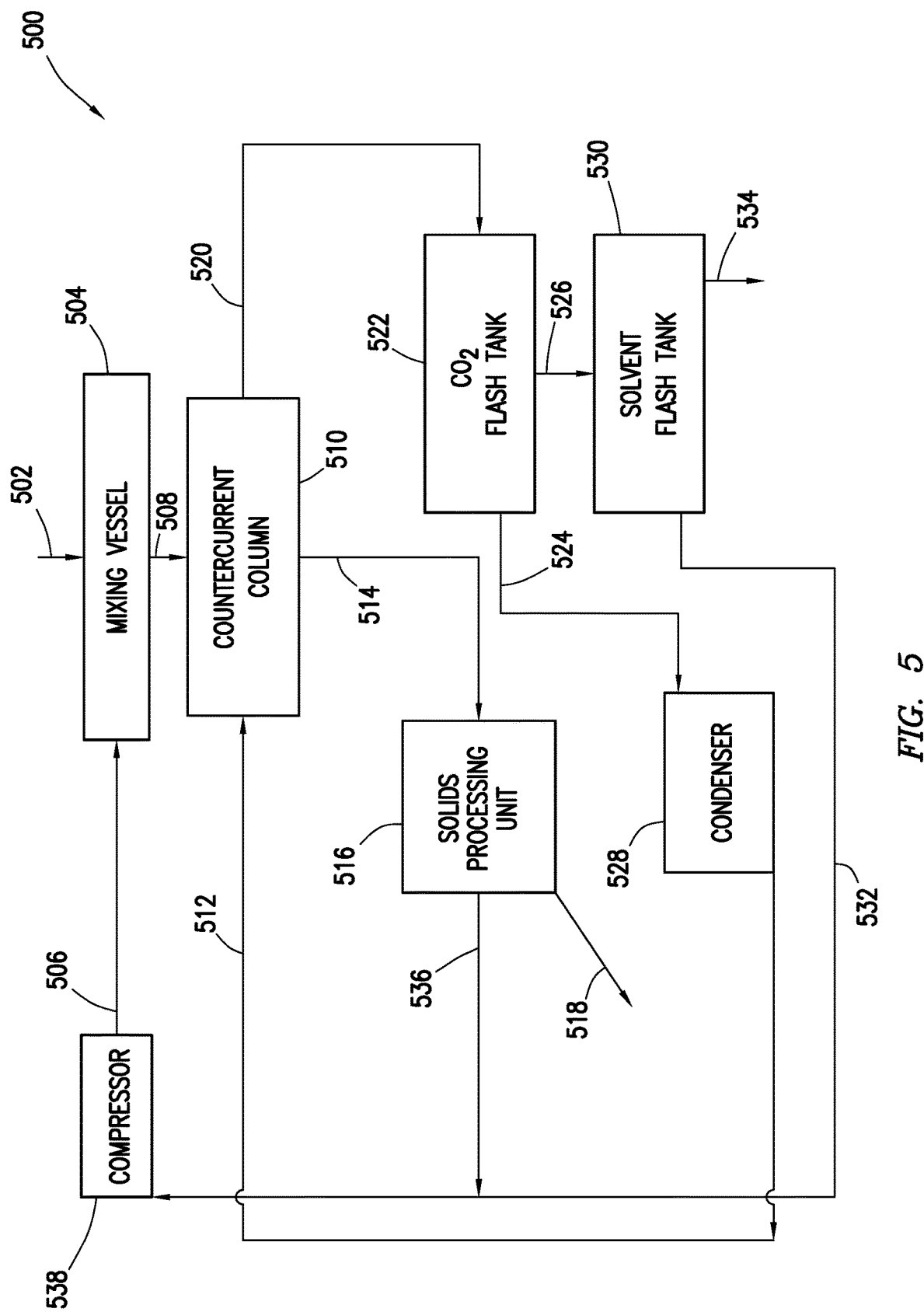
FIG. 5 is a schematic diagram of another example separation system.

Referring now to FIG. 5, an alternative schematic of a separation system 500 is illustrated that may be used for separation of an oilfield emulsion, such as drilling fluid 122. As illustrated, a drilling fluid feed 502 may be supplied to the mixing vessel 504. The drilling fluid feed 502 may comprise a drilling fluid in the form of an invert emulsion that comprises an oleaginous continuous phase and a liquid discontinuous phase. The drilling fluid may have already been pre-treated to remove larger solids therefrom, but may still contain smaller solids. Invert emulsion drilling fluids and their components have been described previously. Recycled solvent 506 may also be supplied to the first mixing tank. From the mixing vessel 504, the mixture of the drilling fluid feed 502 and the recycled solvent 506 may be feed to counter-current column 510 via line 508 for counter-current contact with recycled liquid carbon dioxide 512. An underflow 514 enriched in solids from the drilling fluid feed 502 may be withdrawn from the counter-current column 510 and fed to solids processing unit 516 for further processing, such as drying and degassing (e.g., vacuum stripping, etc.), to separate any remaining solvent and other components from each other. Solid residue 518 may be removed from the solids processing unit 516. A lights overflow 520 containing light fractions such as solvent from the recycled solvent 506, carbon dioxide from the recycled carbon dioxide 512, and the oleaginous phase from the drilling fluid feed 502 may be removed from the counter-current column 510 and supplied to a $CO_2$ flash tank 522 to separate the lights overflow 520 into recovered carbon dioxide 524 and a solvent-oleaginous phase 526. The recovered carbon dioxide 524 may be supplied to condenser 528 and the supplied to counter-current column 510 as recycled liquid carbon dioxide 512, which may also comprise a portion of make-up carbon dioxide. The solvent-oleaginous phase 526 may comprise solvent and the oleaginous phase from the drilling fluid feed 502. The solvent-oleaginous phase 526 may be fed to solvent flash tank 530 to divide the solvent-oleaginous phase 526 into a first recovered solvent 532 and an oleaginous-enriched stream 534, which may be stored and re-used in a drilling fluid, for example. The first recovered solvent 532 may be combined with a second recovered solvent 536 from the solids processing unit 516, supplied to compressor 538, and then supplied to mixing vessel 504 as recycled solvent 506.

Figure 6:
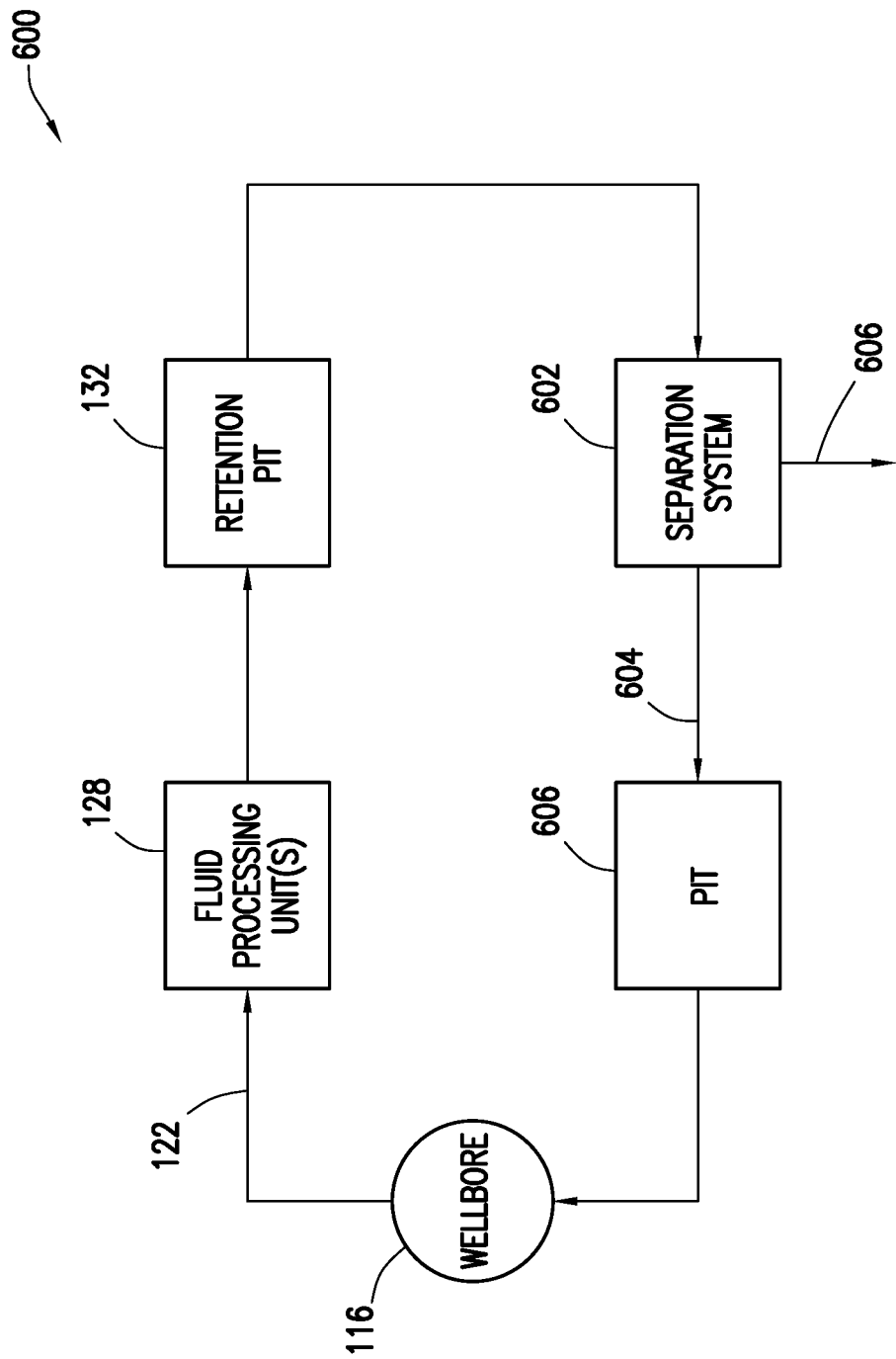
FIG. 6 is a schematic diagram of another example separation system at a well site for recycle and reuse of the drilling fluid.

Referring now to FIG. 6, a well system 600 is illustrated for separation of a drilling fluid 122 for recycle and reuse of the base fluid in the same drilling operation. As illustrated, drilling fluid 122 may be recovered from a wellbore 116. The drilling fluid may be supplied to fluid processing unit(s) 128 and then to retention pit 132. As previously described, the fluid processing unit(s) may include a variety of equipment for solids separation, including one or more of a shaker (e.g., shale shaker), a centrifuge, a hydrocyclone, a separator (including magnetic and electrical separators), a desilter, a desander, a separator, or a filter (e.g., diatomaceous earth filters). However, small solids such as those having a particle size of less than 10 microns may undesirably accumulate in the drilling fluid 122. Accordingly, the well system 600 further includes separation system 602 which may be used to separate low gravity solids from the drilling fluid 122. The separation system 602 may use solvents and/or carbon dioxide as described above in connection with FIGS. 2-5 for separation of low gravity solids from the drilling fluid 122. Accordingly, separation system 602 may separate the drilling fluid 122 into a cleaned drilling fluid 604 and a solid residue 606. The cleaned drilling fluid 604 may be stored in a pit 606, which may be the same or different than retention pit 132, and then reused in drilling the wellbore 116. Drilling fluid additives, which may include viscosifiers, emulsifiers, weighting agents, etc., may be added to the cleaned drilling fluid 604 prior to its reuse in drilling of the wellbore 116.

The preceding description provides various embodiments of the systems and methods of use disclosed herein which may contain different method steps and alternative combinations of components. It should be understood that, although individual embodiments may be discussed herein, the present disclosure covers all combinations of the disclosed embodiments, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and may be modified and practiced in different but equivalent manners apparent to those skilled in the art having the benefit of the teachings herein. Although individual embodiments are discussed, the disclosure covers all combinations of all of the embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those embodiments. If there is any conflict in the usages of a word or term in this specification and one or more patent(s) or other documents that may be incorporated herein by reference, the definitions that are consistent with this specification should be adopted.

What is claimed is:

1. A method for separation of oilfield emulsions comprising:
    flowing a drilling fluid from a wellbore and recovering the drilling fluid, wherein the drilling fluid comprises an oleaginous continuous phase, a discontinuous phase, and wellbore cuttings;
    thereafter, mixing the drilling fluid with at least a solvent to form at least a mixture;
    introducing the mixture into a separation column and contacting the mixture with liquid carbon dioxide;
    withdrawing a lights overflow stream from the separation column, the lights overflow stream comprising at least a portion of the solvent, at least a portion of the carbon dioxide, at least a portion of the oleaginous continuous phase, and at least a portion of the discontinuous phase; and
    separating the light overflow stream and at least partially recovering the oleaginous continuous phase of the drilling fluid.

2. The method of claim 1 wherein the oilfield emulsion comprises a solids-stabilized emulsion.

3. The method of claim 1 wherein the oleaginous continuous phase comprises at least one oleaginous liquid selected from the group consisting of a diesel oil, a crude oil, a paraffin oil, a mineral oil, an olefin, an ester, an amide, an amine, a polyolefin, a polydiorganosiloxane, a siloxane, an organosiloxane, an ether, an acetal, a dialkylcarbonate, a hydrocarbon, and combinations thereof, wherein the volume to volume ratio of the oleaginous continuous phase to the discontinuous phase is in the range of from 20:80 to 95:5.

4. The method of claim 1 wherein the solvent comprises a solvent or mixture of solvents whereby mixing the solvent with the oilfield emulsion breaks a solids-stabilized emulsion in the oilfield emulsion.

5. The method of claim 1 wherein the solvent comprises a paraffinic hydrocarbon having from four carbons to eight carbons.

6. The method of claim 1 wherein the separating the mixture comprises separating the mixture into at least a solids-laden fraction and an oleaginous-solvent fraction.

7. The method of claim 6 wherein the solids-laden fraction comprises barite, and wherein the method further comprising using the barite recovered from the oilfield emulsion in a drilling fluid.

8. The method of claim 6 further comprising separating the solvent oleaginous-fraction into at least a recovered solvent and an oleaginous-enriched phase.

9. The method of claim 1 further comprising, preparing the drilling fluid using at least a portion of the recovered oleaginous phase.

10. The method of claim 1 further comprising mixing the oilfield emulsion with carbon dioxide and recovering and recycling at least a substantial portion of the carbon dioxide and/or the solvent.

11. The method of claim 10 wherein the step of mixing the oilfield emulsion with carbon dioxide comprising counter-currently contacting the mixture of the oilfield emulsion and the solvent with the carbon dioxide.

12. The method of claim 1 further comprising mixing the oilfield emulsion with one or more of a brine, a surfactant, a demulsifying agent, fresh water, steam, a glycerol, a polyol, glycols, or combinations thereof.

13. A method for separation of oilfield emulsions comprising:
  introducing an oilfield emulsion and a solvent into a mixing vessel and mixing the oilfield emulsion and the solvent in the mixing vessel to form a mixed fluid, wherein the oilfield emulsion comprises an oleaginous continuous phase, a discontinuous phase, and wellbore cutting solids;
  introducing the mixed fluid into a separation column and counter currently contacting the mixed fluid with liquid carbon dioxide; and
  withdrawing a lights overflow stream from the separation column, the lights overflow stream comprising at least a portion of the solvent, at least a portion of the carbon dioxide, at least a portion of the oleaginous continuous phase, and at least a portion of the discontinuous phase.

14. The method of claim 13 further comprising introducing the lights overflow stream into a $CO_2$ flash tank and generating a recovered carbon dioxide stream and a solvent-oleaginous stream.

15. The method of claim 14 further comprising compressing at least a portion of the recovered carbon dioxide stream to form at least a portion of the liquid carbon dioxide.

16. The method of claim 14 further comprising introducing the solvent-oleaginous stream into a solvent flash tank and generating an oleaginous-enriched stream and a recovered solvent stream comprising the solvent.

17. The method of claim 15 wherein the solvent comprises a paraffinic hydrocarbon having from four carbons to eight carbons, wherein the recovered solvent stream is in a gas phase, and wherein the method further comprises compressing the recovered solvent stream to form the solvent stream.

18. The method of claim 13 further comprising withdrawing an underflow stream comprising the wellbore cutting solids.

19. The method of claim 17 wherein the underflow stream comprises residual solvent and wherein the method further comprises recovering at least a portion of the residual solvent by drying and/or degassing the wellbore cutting solids.

* * * * *